US011770440B2

(12) United States Patent
Sodagar

(10) Patent No.: US 11,770,440 B2
(45) Date of Patent: *Sep. 26, 2023

(54) EVENTS MESSAGE TRACKS TYPES AND MIXED EVENT MESSAGE TRACKS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/965,728

(22) Filed: Oct. 13, 2022

(65) Prior Publication Data
US 2023/0048945 A1 Feb. 16, 2023

Related U.S. Application Data

(63) Continuation of application No. 17/220,537, filed on Apr. 1, 2021, now Pat. No. 11,546,406.

(60) Provisional application No. 63/088,841, filed on Oct. 7, 2020, provisional application No. 63/009,167, filed on Apr. 13, 2020.

(51) Int. Cl.
| H04L 67/02 | (2022.01) |
| H04N 21/845 | (2011.01) |
| G06F 16/955 | (2019.01) |
| H04L 65/65 | (2022.01) |
| H04L 65/612 | (2022.01) |

(52) U.S. Cl.
CPC ............ *H04L 67/02* (2013.01); *G06F 16/955* (2019.01); *H04L 65/612* (2022.05); *H04L 65/65* (2022.05); *H04N 21/8456* (2013.01)

(58) Field of Classification Search
CPC ....... H04L 67/02; H04L 65/612; H04L 65/65; H04L 67/10; G06F 16/955; H04N 21/8456; H04N 21/26258; H04N 21/84; H04N 21/85406; H04N 21/23614; H04N 21/23605
See application file for complete search history.

(56) References Cited

U.S. PATENT DOCUMENTS

| 2014/0222962 A1 | 8/2014 | Mao |
| 2018/0109743 A1 | 4/2018 | Oh |
| 2018/0199075 A1 | 7/2018 | Wang |
| 2018/0077210 A1 | 8/2018 | Hannuksela |
| 2018/0367823 A1 | 12/2018 | Brinkley et al. |

(Continued)

OTHER PUBLICATIONS

"Information technology—Coding of audio-visual objects-Part 12: ISO base media file format", ISO/IEC, 14496-12, Fifth edition, Dec. 15, 2015, 248 pages.

(Continued)

*Primary Examiner* — Benjamin M Thieu
(74) *Attorney, Agent, or Firm* — Sughrue Mion, PLLC

(57) ABSTRACT

Systems and methods for Dynamic Adaptive Streaming over HTTP (DASH) is provided. A method includes: obtaining an event message track including a plurality of event message boxes, the event message track configured to be processed by a Dynamic Adaptive Streaming over HTTP (DASH) client for displaying media content; obtaining an indicator that indicates each type of the plurality of event message boxes in the event message track; and providing the event message track to the DASH client or displaying media content based on the event message track.

20 Claims, 8 Drawing Sheets

(56) References Cited

U.S. PATENT DOCUMENTS

| | | |
|---|---|---|
| 2019/0104326 A1 | 4/2019 | Stockhammer |
| 2019/0149857 A1 | 5/2019 | Lo et al. |
| 2019/0174161 A1 | 6/2019 | Skupin |
| 2019/0243881 A1 | 8/2019 | Zia |
| 2019/0281100 A1 | 9/2019 | Lo |
| 2022/0116691 A1 | 4/2022 | Stockhammer |

OTHER PUBLICATIONS

"Text of ISO/IEC FDIS 23009-1 4th edition", ISO/IEC JTC 1/SC 29/WG 11, N18609, Aug. 12, 2019, 287 pages.
International Search Report dated Jul. 27, 2021 in International Application No. PCT/US2021/026789.
Kilroy Hughes, et al., "Draft of FDIS of ISO/IEC 23000-19 Common Media Application Format for Segmented Media", ISO/IEC JTC1/SC29/WG11 MPEG117/16819, Apr. 2017, 176 pages, Hobart, Australia.
Written Opinion of the International Searching Authority dated Jul. 27, 2021 in International Application No. PCT/US2021/026789.
Extended European Search Report dated Sep. 1, 2022 in Application No. 21788899.9.
Supplementary European Search Report dated Sep. 20, 2022 in Application No. 21788899.9.
Iraj Sodagar, "[ISOBMFF] Proposed updates on event message track WD", ISO/IEC JTC1/SC29/WG11 MPEG 2020, Apr. 2020, Alpabach, AT (e-meeting), 4 pages total.

FIG. 5

```
'emsg'
scheme_id_uri="urn: mpeg: dash: event: 2012"
value="1"
timescale=1
presentation_time_delta=8
event_duration=0xFFFF
id=12345
message_data="2012-11-01T09: 06: 31.6"
```

500

EVENTS MESSAGE TRACKS TYPES AND MIXED EVENT MESSAGE TRACKS

CROSS-REFERENCE TO THE RELATED APPLICATIONS

This application is a continuation of U.S. application Ser. No. 17/220,537, filed Apr. 1, 2021, which claims priority from U.S. Provisional Application No. 63/009,167, filed on Apr. 13, 2020, and U.S. Provisional Application No. 63/088,841, filed on Oct. 7, 2020, the disclosures of which are incorporated herein by reference in their entirety.

FIELD

Embodiments of the present disclosure are directed to media streaming and, more particularly, Dynamic Adaptive Streaming over HTTP (DASH).

BACKGROUND

ISO/IEC 23009-1 Dynamic Adaptive Streaming over HTTP (DASH) standard introduced events message boxes for carrying events with media segments. ISO/IEC 23000-19 common media application format (CMAF) allows including the event boxes at the beginning of each CMAF Chunk. Carriage of event messages as part of the CMAF sparse metadata track has been recently discussed. However, there is a question raised as to whether such tracks satisfy the fragmentation/defragmentation requirements of ISO/IEC 14496-12 ISO Base Media File Format (ISOBMFF) tracks.

"Information technology—Coding of audiovisual objects—Part 12: ISO base media file format", ISO/IEC 14496-12 (December 2015), "Draft of FDIS of ISO/IEC 23000-19 Common Media Application Format for Segmented Media", ISO/IEC JTC1/SC29/WG11 MPEG117/16819 (April 2017); and "Text of ISO/IEC FDIS 23009-1 4th edition", ISO/IEC JTC 1/SC 29/WG 11 N18609 (August 2019) are incorporated herein by reference in their entirety.

SUMMARY

Moving Pictures Experts Group (MPEG) DASH provides a standard for streaming multimedia content over Internet Protocol (IP) networks. While the standard supports the signaling of media presentation description (MPD) events and inband events in MPD, it does not provide a solution for signaling the sparse timed metadata tracks content.

Sparse timed metadata tracks may carry similar information as MPD events and inband events. However, when timed metadata tracks carry emsg (event message) boxes as parts of the metadata samples, each event message box includes its timing and that time uses each CMAF Chunk or Track earliest presentation time as its anchor. On the other hand, ISOBMFF requires that the timing of data is preserved if an ISOBMFF track goes through any arbitrary fragmentation and defragmentation process. Sparse timed metadata tracks carrying embedded events may not be able to support this requirement due to the loss of Chunk boundaries in the process.

Embodiments of the present disclosure solve this problem by providing mixed event message tracks that allow the combination of v0 and v1 event message boxes. Embodiments of the present disclosure further define various event message tracks and the signaling for their types in a track header.

While MPEG DASH provides a method for streaming timed metadata tracks, the usual samples in timed metadata tracks may have variable size. Therefore, finding the location of a specific sample is not trivial and required parsing all previous samples in a segment or having associated index segments.

However, some metadata tracks can be structured to have a fixed sample structure for some applications in which the producer may be able to maintain a fixed size for all samples in all segments. Such constraints simplify the navigation of a player on the track.

Embodiments of the disclosure provide methods and systems for indicating whether timed metadata samples in a track are fixed-size samples and, if they are, signal the size of the samples. Therefore, a client can random-access the track for any desired presentation time without any additional size or index information.

According to one or more embodiments, a method performed by at least one processor is provided. The method includes: obtaining an event message track including a plurality of event message boxes, the event message track configured to be processed by a Dynamic Adaptive Streaming over HTTP (DASH) client for displaying media content; obtaining an indicator that indicates each type of the plurality of event message boxes in the event message track; and providing the event message track to the DASH client or displaying media content based on the event message track.

According to an embodiment, the indicator indicates that each of the plurality of event message boxes is a same event message box type.

According to an embodiment, the indicator indicates that the event message track includes at least two types of event message boxes.

According to an embodiment, the indicator indicates that at least one of the plurality of event message boxes has a negative presentation time offset relative to a sample presentation time.

According to an embodiment, the indicator is a Uniform Resource Name (URN).

According to an embodiment, the indicator is Uniform Resource Indicator (URI) data value.

According to an embodiment, the obtaining the indicator comprises inserting the indicator in a header of the event message track.

According to an embodiment, the event message track further includes a track header that includes a flag indicating whether every metadata sample of the event message track has a constant size.

According to an embodiment, the track header further includes a syntax element that indicates a size of each metadata sample of the event message track in a case where the flag indicates that every metadata sample of the event message track has the constant size.

According to an embodiment, the event message track is a timed metadata track.

According to one or more embodiments, a system is provided. The system includes: at least one memory storing computer code; and at least one processor configured to access the computer code and operate as instructed by the computer code, the computer code including: event message track obtaining code configured the cause the at least one processor to obtain an event message track, the event message track configured to be processed by a Dynamic Adaptive Streaming over HTTP (DASH) client for displaying media content. The event message track obtaining code including: event message box obtaining code configured to cause the at least one processor to obtain a plurality of event message boxes of the event message track; and indicator obtaining code configured to cause the at least one processor to obtain an indicator that indicates each type of the plurality of event message boxes in the event message track. The computer code further including providing or displaying code configured to cause the at least one processor to provide the event message track to the DASH client or display media content based on the event message track.

According to an embodiment, the indicator indicates that each of the plurality of event message boxes is a same event message box type.

According to an embodiment, the indicator indicates that the event message track includes at least two types of event message boxes.

According to an embodiment, the indicator indicates that at least one of the plurality of event message boxes has a negative presentation time offset relative to a sample presentation time.

According to an embodiment, the indicator is a Uniform Resource Name (URN).

According to an embodiment, the indicator is Uniform Resource Indicator (URI) data value.

According to an embodiment, the indicator is in a header of the event message track.

According to an embodiment, the event message track further includes a track header that includes a flag indicating whether every metadata sample of the event message track has a constant size.

According to an embodiment, the track header further includes a syntax element that indicates a size of each metadata sample of the event message track in a case where the flag indicates that every metadata sample of the event message track has the constant size.

According to one or more embodiments, a non-transitory computer-readable medium storing computer code is provided. The computer code is configured to, when executed by at least one processor, cause the at least one processor to: obtain an event message track including a plurality of event message boxes, the event message track configured to be processed by a Dynamic Adaptive Streaming over HTTP (DASH) client for displaying media content; obtain an indicator that indicates each type of the plurality of event message boxes in the event message track; and provide the event message track to the DASH client or display media content based on the event message track

BRIEF DESCRIPTION OF THE DRAWINGS

Further features, the nature, and various advantages of the disclosed subject matter will be more apparent from the following detailed description and the accompanying drawings in which:

FIG. 5 illustrates an example of an event message box according to an embodiment.

DETAILED DESCRIPTION

Figure 1:
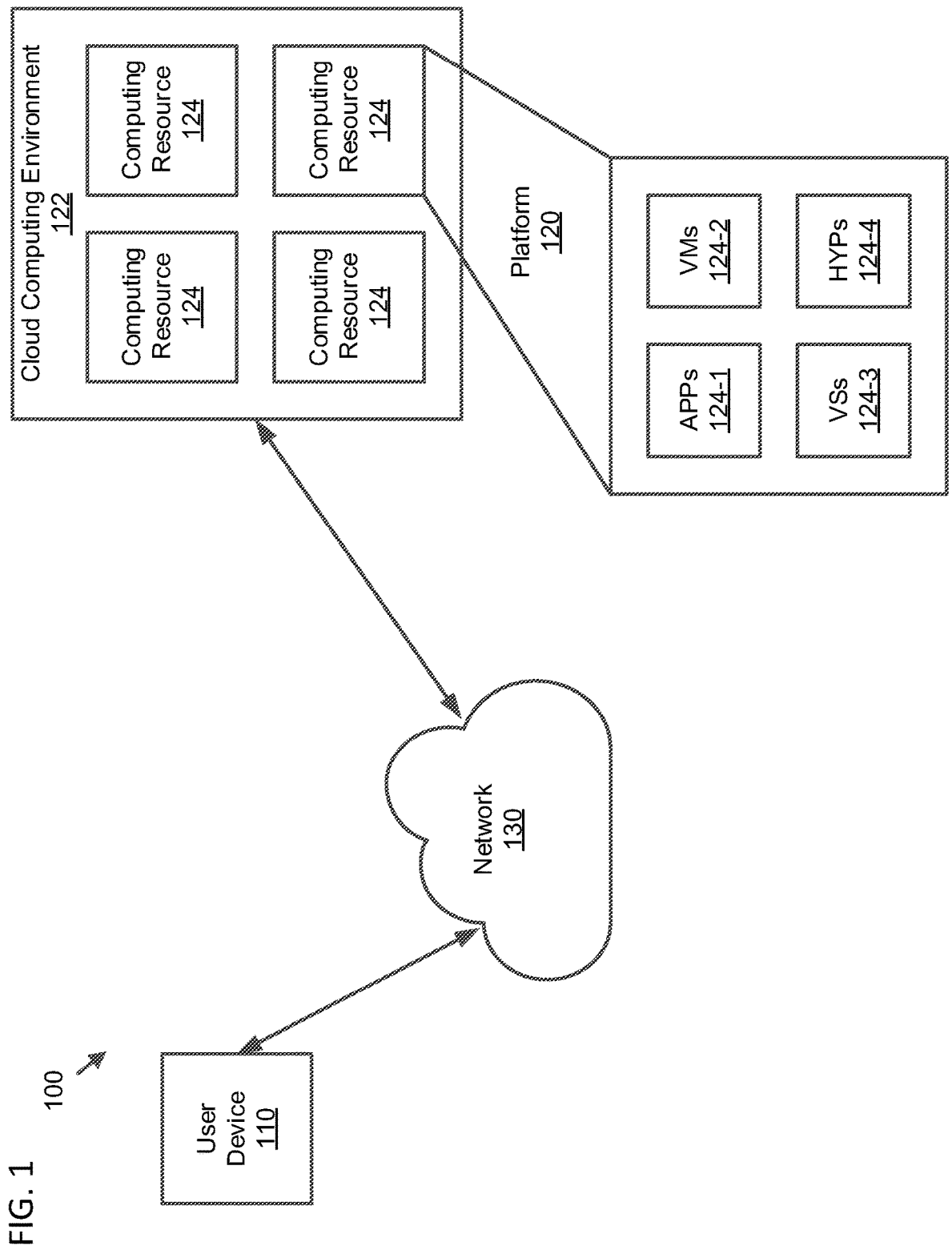
FIG. 1 is a diagram of an environment in which methods, apparatuses and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
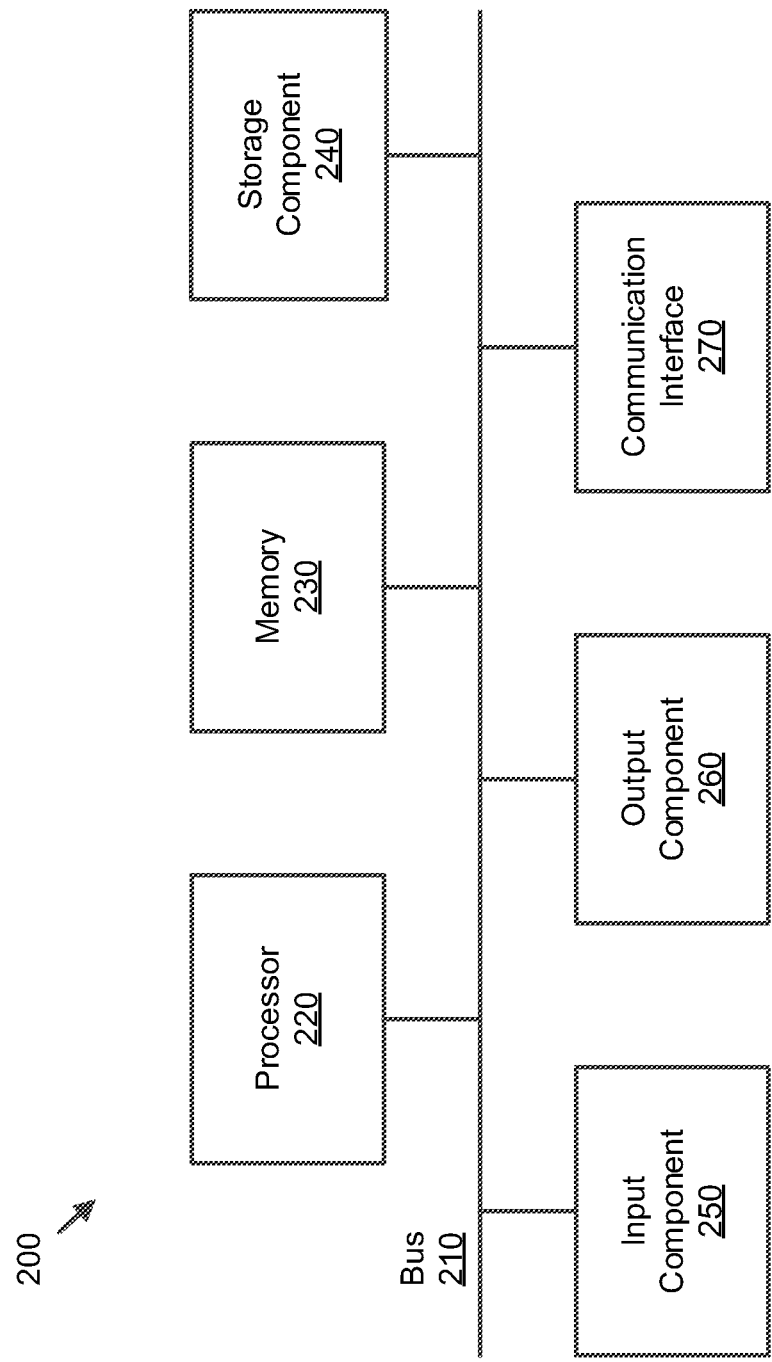
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
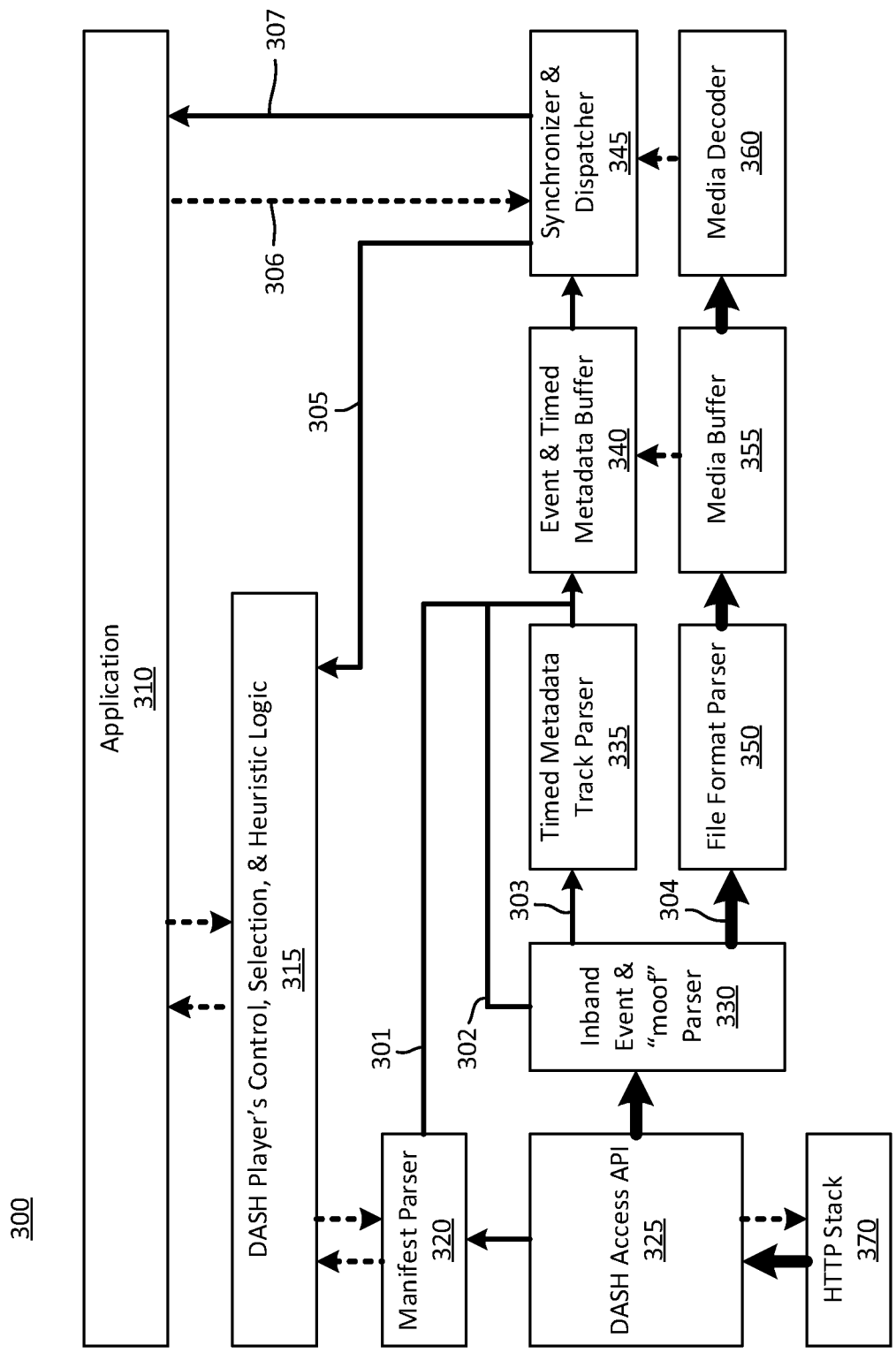
FIG. 3 is a diagram of a DASH client according to an embodiment.

FIG. 3 illustrates an example DASH client 300 that is configured to process MPD events 301, inband events 302, and sparse timed metadata track events, according to embodiments of the present disclosure. The DASH client 300 can also be used for processing CMAF events. According to an embodiment, the DASH client 300 may be implemented by the user device 100 of FIG. 1.

Events may be provided in order to signal aperiodic information to the DASH client 300 or to an application. Events may be timed (e.g. each event starts at a specific media presentation time and may have a duration). Events may include DASH specific signaling or application-specific events. DASH events may be identified by scheme identifiers. For application specific events, a scheme identifier may identify the application such that the DASH client 300 can forward the event to the proper application.

As shown in FIG. 3, the DASH client 300 may include an application 310, a DASH player's control, selection, & heuristic logic 315, a manifest parser 320, a DASH access API 325, an inband event & "moof" (movie fragment box) parser 330, a timed metadata track parser 335, an event & timed metadata buffer 340, a synchronizer & dispatcher 345, a file format parser 350, a media buffer 355, a media decoder 360, and an HTTP stack 370.

In FIG. 3, the broken lines represent control and/or synchronization; the regular, solid lines represent event and/or timed metadata flow; and the bold, solid lines represent media data flow. The control and/or synchronization may include, for example, a subscription function 306 and an event/metadata API 307. The event and/or timed metadata flow may include, for example, the MPD events 301, the inband events 302, the timed metadata 303, and the DASH events 305. The media data flow may include, for example, media segments 304.

The DASH client 300 may receive a manifest, such as MPDs, and may process them. The manifest may describe a combination and synchronization of independently packaged CMAF tracks grouped in CMAF switching sets and selection sets to form a synchronized multimedia presentation. The manifest may provide the DASH client 300 with information to select, initialize, start align, and synchronize the CMAF track(s) to be played, and identify CMAF media objects (e.g. CMAF headers, CMAF chunks, and CMAF fragments) as resources to access and to possibly download them. CMAF tracks and CMAF fragments may contain sufficient information to enable decryption, decoding, and presentation scheduling. The manifest can also provide information on delivery protocol, network management, authorization, license acquisition, etc., in addition to resource identification and presentation description. The manifest can also signal that tracks conform to a CMAF media profile.

For reference, a CMAF fragment may be a media object that is encoded and decoded. A CMAF fragment may include one or more pairs of a movie fragment box ('moor') and a media data box ('mdat'). Each pair of 'moor' and 'mdat' may be referred to as a CMAF chunk, and each CMAF chunk may contain a consecutive subset of media samples belonging to a CMAF fragment.

A CMAF track may be a continuous sequence of one or more CMAF fragments in presentation order conforming to a CMAF media profile, and an associated CMAF header. The CMAF header may contain a MovieBox that is sufficient to process and present all CMAF fragments in the CMAF track. A CMAF track may be produced by an encoder and an ISOBMFF file packager, but may be made to be accessible in the form of CMAF addressable media objects that can be references as resources defined by an external media application specification.

The DASH client 300 may request media segments based on described addresses in the manifest. The manifest may also describe metadata tracks. The DASH client 300 can also access the segment of metadata tracks, parse them, and send them to the application.

Also, of addresses for media segments, a DASH manifest may provide addressed for Index segments. Each index segment may provide information about one segment duration and size. A Representation Index may provide the index information for all segments of a given representation.

According to embodiments, the manifest parser 320 may parse MPD events 301 from the manifest, and append them to the event & timed metadata buffer 340. Based on the MPD, the DASH client 300 may manage the fetching and parsing of Segments from the HTTP stack 370. The parsing of the Segments may be performed by the inband event & "moof" parser 330. The inband event & "moof" parser may parse media segments 304 from the Segments before appending them to the media buffer 355. The parsing by the inband event & "moof" parser 330 may also include parsing inband events 302 and timed metadata 303 (e.g. timed metadata tracks) from the Segments. Also, the timed metadata track parser 335 may parse and append high-level boxes such as event message boxes of the timed meta data 303 to the event & timed metadata buffer 340.

The event & timed metadata buffer 340 may pass the events and timed metadata samples to the synchronizer & dispatcher 345, which may be referred to as an event & timed metadata synchronizer & dispatcher function.

The synchronizer & dispatcher 345 may dispatch DASH client 300 specific events to the DASH player's control, selection, & heuristic logic 315. If the application 310 is subscribed to a specific event(s) and/or timed metadata stream(s), the synchronizer & dispatcher 345 may dispatch the corresponding event instances and/or timed metadata samples to the application 310 via the event/metadata API 307.

Figure 4:
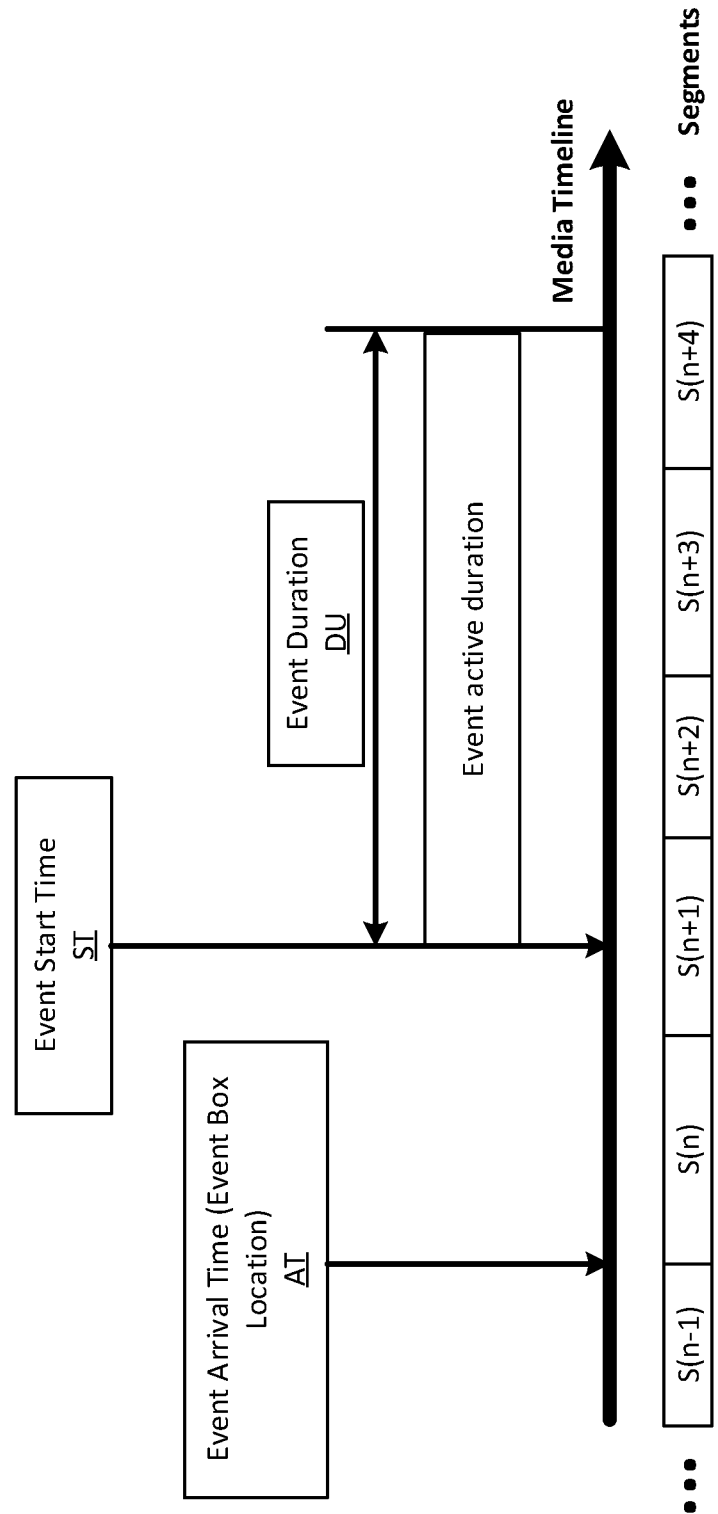
FIG. 4 illustrates an event timing model according to an embodiment.

Embodiments of the present disclosure may include the inband events 302 in DASH and CMAF. For example, FIG. 4 shows an example timing of an event message (emsg) box defined by ISO/IEC 23009-1, which may be implemented by embodiments of the present disclosure. The event message box may provide signally for events relating to media presentation time, and may carry signaling specific to DASH operations.

As shown in the diagram 400 of FIG. 4, an event may have an event arrival time AT, an event start time ST, and an event duration DU. The event arrival time AT is the earliest presentation time of the segment containing the event message box, and may be considered as the location of the event message box on the media timeline. The event start time ST may be the moment in the media timeline that the event becomes active. The event duration DU may be the duration for which the event is active. The event message box may include parameters that specify the event arrival time AT, the event start time ST, and the event duration DU, or may include parameters from which such times and durations may be calculated. For example, as shown in FIG. 5, an event message box 500 may include an "event duration" parameter that specifies the event duration DU.

The event start time ST can have an offset from the location of the DASH segment (e.g. one of segments S(n−1) to S(n+4)) or CMAF Chunk that carries the event in the track. According to embodiments, with reference to FIG. 5, the event message box 500 may include a "presentation_time_delta" parameter that specifies an offset of the event start time ST from the location of the DASH segment or CMAF Chunk that carries the event in the track.

The anchor of the event start time ST is different depending on the version of the event message box:
1. In event message version 0, the anchor is the earliest presentation time of CMAF Fragment/DASH segment 410 carrying the event.
2. In event message version 1, the anchor is the earliest presentation time of CMAF Track/DASH Period carrying the event.

Additionally, ISO/IEC 23000-19 requires:
1. The timescale of events to be equal to the value of the timescale field in the MediaHeaderBox of the CMAF track.
2. The emsg box can be inserted at the beginning of a CMAF Chunk, CMAF Fragment or CMAF Segment.
3. The anchor of emsg Version 0 in a CMAF fragment to be the earliest presentation time of the following fragment.

And finally, the event message box has the following constraints according to ISO/IEC 23009-1:
1. It may be placed before the first "moof" box (movie fragment box) of the segment.
2. It may be placed in between any "mdat" box (media data box) and "moof" box. In this case, an equivalent "emsg" with the same id value may be required to be present before the first "moof" box of any segment.

The fragmentation/defragmentation process of ISOBMFF may take a fragmented ISOBMFF Track, defragment it, and as a further step, re-fragment it with an arbitrary size of fragments. In either process, the resulting non-fragmented or fragment track should be a valid ISOBMFF track. In this case, all event message boxes included in the new track may be required to maintain the correct timing.

Embodiments of the present disclosure may obtain (e.g. create or process) a timed metadata track for DASH streaming. Aspects of the timed metadata track are described below.

Figure 6:
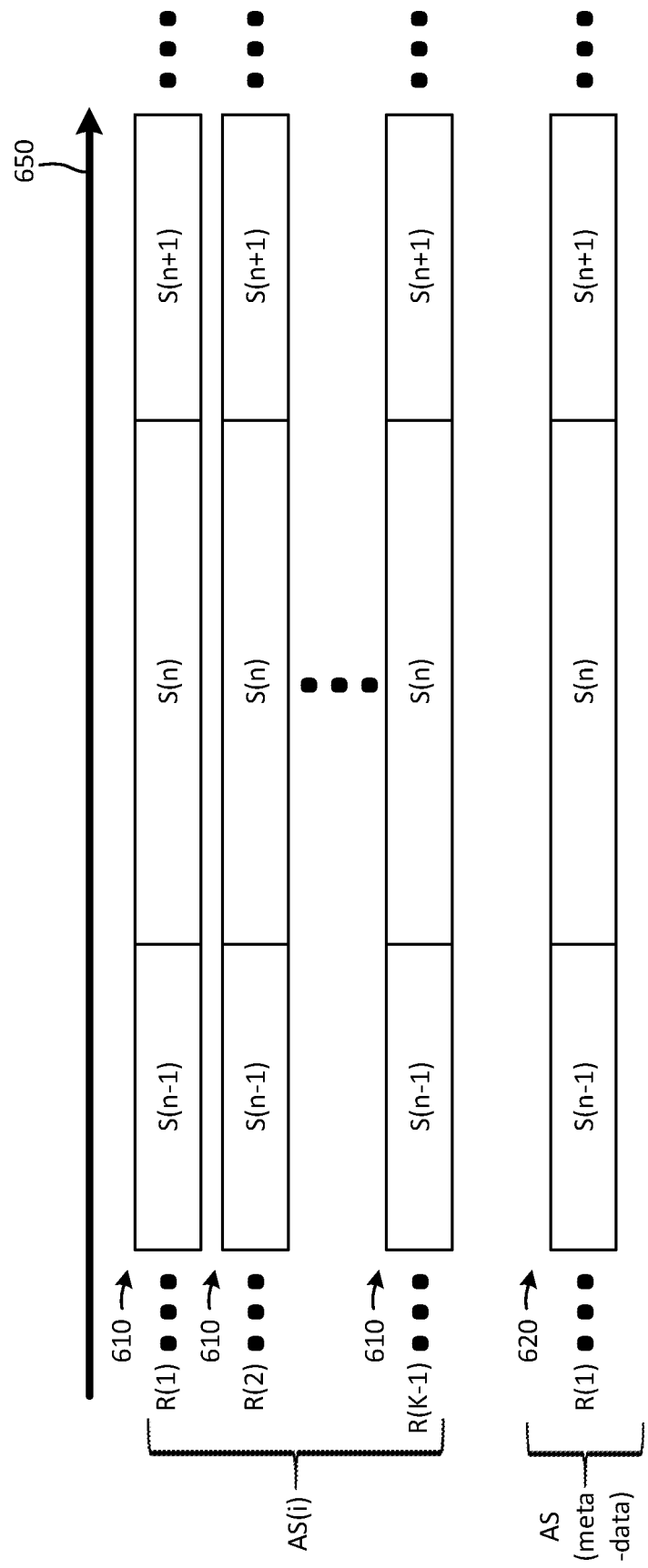
FIG. 6 is a diagram of adaptation sets according to an embodiment.

According to embodiments, with reference to FIG. 6, for each adaptation set that the instantaneous segment bandwidth is expected to be signaled, a separate adaptation set may be included in the manifest.

For example, an adaptation set AS(i) and an adaptation set AS(metadata) may be provided. The adaptation set AS(i) and the adaptation set AS(metadata) may each include a respective representation R(1). The adaptation set AS(i) may also include additional representations (e.g. representation R(2) to representation R(K−1)). Each representation may include respective segments (e.g. segment S(n−1), segment S(n), . . . , segment S(n+1)) along a media timeline 650. The representations of the adaptation set AS(i) may be media tracks 610. The representation of the adaptation set AS(metadata) may a timed metadata track 620.

As shown in FIG. 6, the timed metadata track 620 can be timed aligned at the segment level with media tracks 610 of the adaptation set AS(i), or the timed metadata track 620 can have a single segment with its sub-segment timed aligned with the corresponding media segments in the corresponding adaptation set AS(i).

[Timed Metadata Track Structure]

The timed metadata track 620 may be an ISOBMFF timed metadata track with the following structure.

A. Timed Metadata Track Header

The header of the timed metadata track 620 may include the following information:
1. A track 4CC identifier;
2. A flag that indicates whether the sample sizes are constant, and if so the size of the metadata sample;
3. Number of tracks in the switching set;
4. The track identifiers of the switching set's tracks; and
5. Other information relevant to the track.

B. Segments

The metadata segments of the timed metadata track 620 may have the following characteristics:
1. All segments are timed aligned with the corresponding switching set's segments.
2. All chunks are timed aligned with the corresponding switching set's chunks.
3. All segments have a 4CC identifier in their brand.

C. Metadata Samples

If the constant sample size is set in the header of the timed metadata track 620, all metadata samples of the timed metadata track 620 have a constant size equal to that value in the header of the timed metadata track 620.

[Manifest Constraints]

The timed metadata track 620, having the constant sample size, may be included in a separate adaptation in the manifest. This adaptation set may have the following constraints:
1. The number of chunks/segments of the timed metadata track 620 may be equal to the number of chunks/segments of any representation in the referenced adaptation set, or
2. A single segment track with a single address can be used.

[Timed Metadata Header With a Constant Sample Size]

An example implementation of a timed metadata track structure, according to an embodiment of the present disclosure, is described below.

The sample entry can be defined as the following:

```
class {name of sample entry}( )
    extends MetaDataSampleEntry ('{4CC}') {
    '{name of the Box}'( );
}
aligned(8) class '{name of ConfigurationBox}'
    extends FullBox('{4CC}', version = 0, flags = 0) {
    unsigned int(16) num_tracks;
    unsigned int (15) reserved;
    bit(1)constant_size_flag;
    for(i=1; i <= num_tracks; i++) {
        unsigned int(32) track_id;
    }
    if (constant_size_flag){
        unsigned int(16) sample_size;
    }
}
```

With respect to the sample entry, the names in "{ . . . }" may be replaced with the specific names for a given timed metadata track. Also, the metadata track header may have other fields.

In the above sample entry, num_tracks indicates the number of tracks in the switching set, the syntax element track_id provides the ordering of the track_ids in the samples, and constant_size_flag identifies whether every sample in this track has the same byte size.

In the above sample entry, the constant sample size flag (constant_size_flag) and a syntax element indicating the sample size (sample_size) are signaled, but other syntax elements may also be signaled.

According to embodiments, a method is provided. The method includes creating metadata tracks with the possibility of constant sample sizes, wherein whether the samples of a metadata track have a fixed size is signaled in the metadata track header, along with this fixed size, wherein the metadata track, track segments, and track chunks have a uniform structure of metadata samples. Accordingly, a player may access any sample of the metadata track just by calculating its offset from the start of the metadata track or the start of a segment or the start of a chunk of the metadata track.

Figure 7:
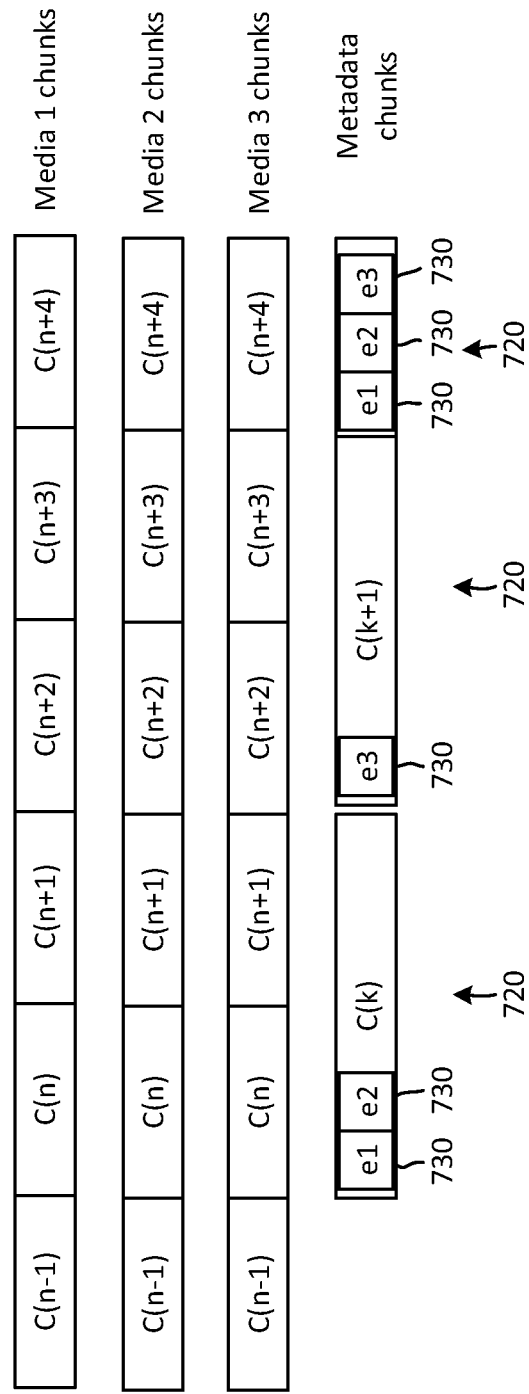
FIG. 7 is a diagram of media and metadata tracks according to an embodiment.

Embodiments of the present disclosure may include embedded events in a sparse timed metadata track. For example, the diagram 700 illustrated in FIG. 7 shows an example of embedded event message boxes 530 in a sparse timed metadata track that includes metadata chunks 720 (e.g. chunk C(k), chunk C(k+1), etc.), according to an embodiment of the present disclosure. The metadata chunks 720 may be aligned with one or more of media chunks (e.g. media chunks C(n−1), C(n), C(n+1), C(n+2), C(n+3), C(n+4), etc.)

With reference to FIG. 7, the sparse timed metadata track carries emsg boxes 730 at part of metadata samples. A metadata sample may contain one or more emsg boxes 730. Each emsg box 730 belongs to an event scheme that is defined by emsg's scheme_id_uri/value pair.

Embodiments of the present disclosure may provide constraints on the embedded sparse timed metadata tracks.

For example, embodiments of the present disclosure may provide one or more of the following constraints on CMAF sparse timed metadata tracks to satisfy ISOBMFF fragmentation/defragmentation process:

1. Each CMAF Fragment/DASH segment contains only one metadata sample. The duration of the metadata sample is the duration of the fragment/segment.
2. In non-fragmented tracks, every event message box version 0 may be required to use the presentation time of the metadata sample that it is included in, as the anchor for its presentation_time_delta parameter.
3. In all cases, version 0 presentation time delta may show the positive or negative offset relative to the metadata sample presentation time. All event message boxes of the track may be required to use either positive or negative offset, and event massage boxes with negative and positive offsets may be required to not be mixed in the same track.
4. In non-fragmented tracks, every event message box version 1 may be required to use the earliest presentation time of the track as the anchor for its presentation time parameter.
5. In all cases, the time scale of every event message box version 0 and 1 may be required to be equal to the timescale of the track.
6. Every event's end time (event start time+duration) does not go beyond the latest presentation time of the track, even if the value of event duration signals otherwise.

Embodiments of the present disclosure may define four different types of event message tracks (e.g. sparse timed metadata tracks) as defined below in TABLE 1:

TABLE 1

Event Message track types

| Track Type | Track Requirements |
| --- | --- |
| zero | Every event message box of the track is v0 with a positive presentation time offset relative to sample presentation time. |
| one | Every event message box of the track is v1. |
| mixed | Every event message box of the track is either v0 or v1. |
| negative | Every event message box of the track is v0 with its presentation_time_delta represents a negative presentation time offset relative to the sample presentation time. |
| negative mixed | Every event message box of the track is either: v0 with its presentation time delta represents a negative presentation time offset relative to the sample presentation time. v1. |

Each type limits the versions of event message boxes and the interpretation of event message box time offset. As shown in Table 1, a track may contain version 0 only, version 1 only, version 0 with a negative time offset only, version 0 and version 1, or version 0 with a negative time offset and v1 of event message boxes.

Additional types of event message tracks can be added to this table, by introducing new versions of event message boxes or introducing a different interpretation of their time offsets values.

The types may be signaled in the track header of the event message track as well as in a streaming manifest such as DASH MPD and HLS m3u8.

Embodiments of the present disclosure may include two options for signaling the track types for ISOBMFF tracks: (1) using separate Uniform Resource Identifiers (URIs), and (2) using "URIInitBox". Either option can be used in embodiments.

With respect to option (1), event message tracks may be required to use the UREMetaSampleEntry ("urim"). The UREMetaSampleEntry entry may contain, in a box, the URI defining the form of the metadata, and optional initialization data. The format of both the samples and of the initialization data may be defined by all or part of the URI form.

In the sample entry, a "URIBox" may be required to occur, carrying the exact URN scheme, depending on the event message boxes they carry as defined in TABLE 2 below:

TABLE 2

Event Message track identifiers

| Track Type | URN |
| --- | --- |
| zero | urn:mpeg:isobmff: eventtrack: v0:2020 |
| one | urn:mpeg:isobmff:eventtrack:v1:2020 |
| mixed | urn:mpeg:isobmff: eventtrack:v0v1:2020 |
| negative | urn:mpeg:isobmff: eventtrack:n0:2020 |
| negative mixed | urn:mpeg:isobmff: eventtrack:n0v1:2020 |

With respect to option (2), as shown below in TABLE 3, event message tracks may be required to use the UREMetaSampleEntry ('urim'). In the sample entry, the following may be required to occur:
1. A "URIBox", carrying the exact Uniform Resource Name ("URN") scheme: urn:mpeg:isobmff:eventtrack: 2020
2. A "URIInitBox", carrying one of the values shown in TABLE 3, provided below, in the existing event message box versions in the event message track.

TABLE 3

The uri_initialization_data value for various track types

| Track Type | Value |
| --- | --- |
| zero | 1 |
| one | 2 |
| mixed | 12 |
| negative | −1 |
| negative mixed | −12 |

According to embodiments, a method be provided that includes creating event message track with different types, wherein depending on the type, various event message versions and/or different interpretations of event message presentation time offset can be included. Accordingly, embodiments may allow mixing event message boxes of version 0 and version 1, and allow having negative time offsets from sample presentation time in some event message track types.

According to embodiments, the signaling of the event message track types may be provided in the track header, and therefore any entity processing the track can recognize the track type and process the event boxes in the message track correctly.

According to embodiments, the signaling of the event message track types may be done via a URI variation in URIBox or using different values in URIInitBox for signaling the tracks in ISOBMFF tracks.

Figure 8:
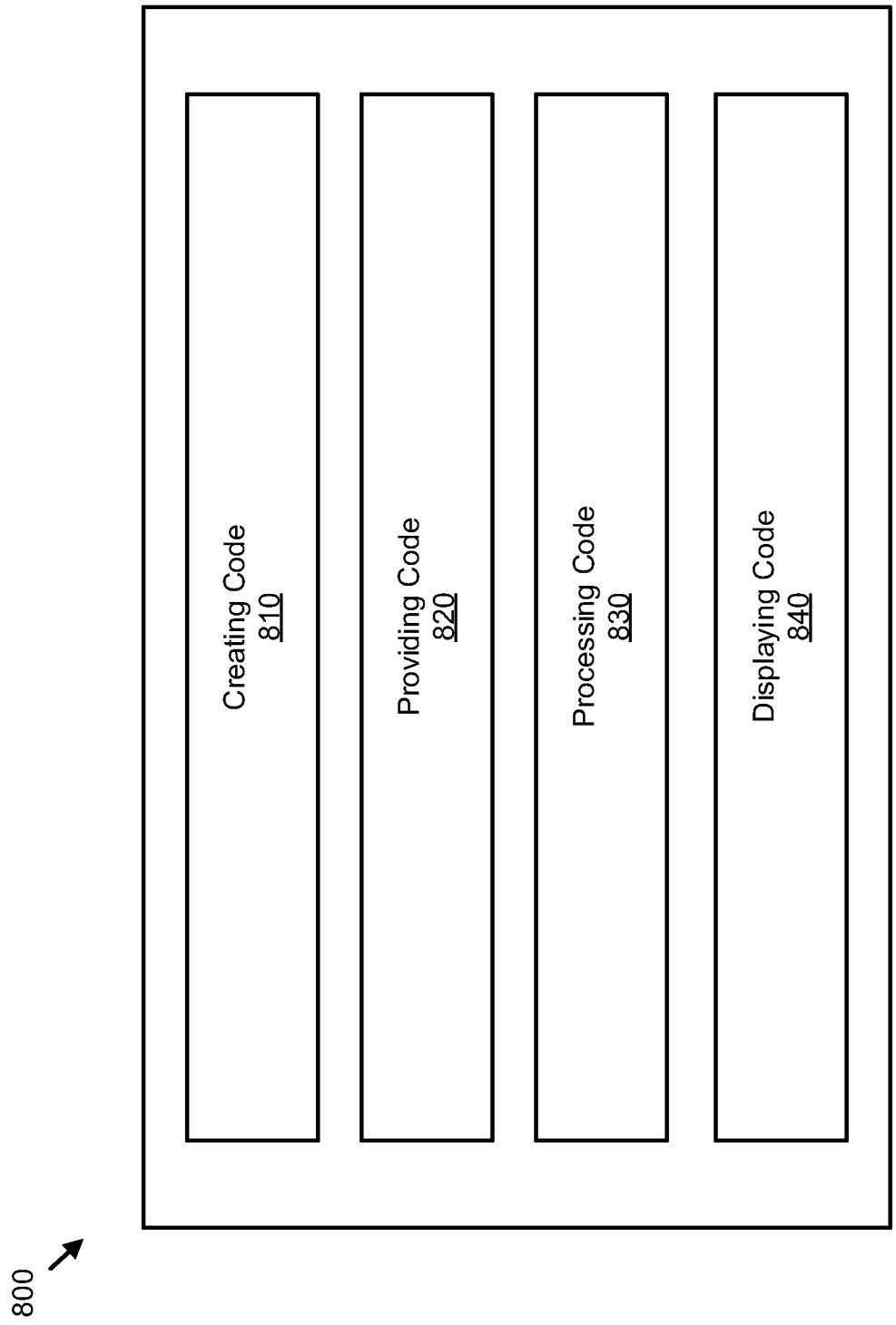
FIG. 8 is a diagram of computer code according to an embodiment.

With reference to FIG. 8, computer code 800 according to embodiments is described. The computer code 800 may performed by a media streaming system that includes the DASH client 300. For example, the media streaming system may be implemented by the environment 100 described with respect to FIG. 1. The media streaming system may comprise memory configured to store computer code 800, and at least one processor configured to access the computer code 800 and operate as instructed by the computer code 800. The computer code 800 may be distributed amongst memory of different components of the media streaming system (e.g. servers, clients, etc.) and may be configured to cause the at least one processor of the specific component to perform any number of their functions, including the functions described in the present disclosure. For example, the computer code 800 may comprise any number of creating code 810, providing code 820, processing code 830, and displaying code 840.

The creating code 810 may be stored in, for example, memory of a server of the media streaming system, and cause at least one processor of the server to create data described herein (e.g. timed metadata tracks) that are to be delivered to a client of the media system (e.g. a DASH client) to be processed.

The providing code 820 may be stored in, for example, the memory of the server of the media streaming system, and cause at least one processor of the server to provide the data described herein (e.g. timed metadata tracks) to the client of the media system (e.g. a DASH client) to be processed.

The processing code 830 may be stored in, for example, memory of the client device of the media streaming system, and cause at least one processor of the client device to process the data (e.g. timed metadata tracks) described in the present disclosure, after the client receives the data. For example, the data may be processed as described with respect to FIG. 3.

The creating code 810 and the processing code 830 may both be referred to as obtaining code for obtaining the data.

The displaying code 840 may be stored in, for example, the memory of the client device of the media streaming system, and cause at least one processor of the client device to display media content on a display, included in or connected to the client device, in accordance with the data that is processed.

The embodiments of the present disclosure may be used separately or combined in any order. Further, each of the methods, servers, and clients may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, it should be understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor, the method comprising:
    obtaining an indicator included in an event message track and indicating each one of multiple types of a plurality of event message boxes in the event message track; and
    providing the event message track to a client or displaying media content based on the event message track.

2. The method of claim 1, wherein the indicator indicates that the event message boxes are of a same type.

3. The method of claim 1, wherein the indicator indicates that the event message track includes at least two types of event message boxes.

4. The method of claim 1, wherein the indicator indicates that at least one of the event message boxes has a time offset relative to a sample presentation time.

5. The method of claim 1, wherein the indicator is a Uniform Resource Name (URN).

6. The method of claim 1, wherein the indicator is Uniform Resource Indicator (URI) data value.

7. The method of claim 1, wherein the obtaining the indicator comprises inserting the indicator in a header of the event message track.

8. The method of claim 1, wherein the event message track further includes a track header that includes a flag indicating whether metadata samples of the event message track have a constant size.

9. The method of claim 8, wherein the track header further includes a syntax element that indicates a size of each of the metadata samples.

10. The method of claim 1, wherein the event message track is a timed metadata track.

11. A system comprising:
    at least one memory storing computer code; and
    at least one processor configured to access the computer code and operate as instructed by the computer code, the computer code including:
        indicator obtaining code configured to cause the at least one processor to obtain an indicator included in an event message track and indicating each one of multiple types of a plurality of event message boxes in the event message track; and
        providing or displaying code configured to cause the at least one processor to provide the event message track to a client or display media content based on the event message track.

12. The system of claim 11, wherein the indicator indicates the event message boxes are of a same type.

13. The system of claim 11, wherein the indicator indicates that the event message track includes at least two types of event message boxes.

14. The system of claim 11, wherein the indicator indicates that at least one of the event message boxes has a time offset relative to a sample presentation time.

15. The system of claim 11, wherein the indicator is a Uniform Resource Name (URN).

16. The system of claim 11, wherein the indicator is Uniform Resource Indicator (URI) data value.

17. The system of claim 11, wherein the indicator is in a header of the event message track.

18. The system of claim 11, wherein the event message track further includes a track header that includes a flag indicating whether metadata samples of the event message track have a constant size.

19. The system of claim 18, wherein the track header further includes a syntax element that indicates a size of each of the metadata samples.

20. A non-transitory computer-readable medium storing computer code that is configured to, when executed by at least one processor, cause the at least one processor to:
    obtain an indicator included in an event message track and indicating each one of multiple types of a plurality of event message boxes in the event message track; and
    provide the event message track to a client or display media content based on the event message track.

* * * * *